Nov. 24, 1959   W. S. PRAEG ET AL   2,913,858
GEAR HONING TOOL
Filed Sept. 4, 1957

INVENTORS
WALTER S. PRAEG
JOHN J. SIGMAN Jr.
BY Whittemore, Hulbert
& Belknap ATTORNEYS United States Patent Office 2,913,858
Patented Nov. 24, 1959

2,913,858
GEAR HONING TOOL

Walter S. Praeg and John J. Sigman, Jr., Detroit, Mich., assignors to National Broach & Machine Company, Detroit, Mich., a corporation of Michigan Application September 4, 1957, Serial No. 681,971

8 Claims. (Cl. 51—206)

The present invention relates to a gear honing tool, and is a continuation-in-part of our prior copending application Serial No. 543,704, filed October 31, 1955.

It is an object of the present invention to provide a gear honing tool in the form of a gear having teeth the surface portions of which to a substantial depth are composed of a suitable relatively hard, strong, slightly yieldable and highly resistant resin compound having distributed therein a multiplicity of abrasive particles.

It is a further object of the present invention to provide a gear honing tool as described in the preceding paragraph in which the resin component of the compound is essentially epoxy resin.

It is a further object of the present invention to provide a gear finishing hone as described in either of the preceding paragraphs in which the resin compound includes fiber particles as a reinforcing filler.

It is a further object of the present invention to provide a gear honing tool as described in any of the foregoing paragraphs in which the resin compound includes extremely fine grit for the purpose of rendering the compound wear resistant.

More specifically, it is an object of the present invention to provide a gear finishing hone at least the tooth portions of which are formed of a resin compound having an operating hardness in the range from 90 points above zero to 40 points below zero on the Rockwell M scale.

Other objects and features of the invention will become apparent as the description proceeds, especially when taken in conjunction with the accompanying drawing, illustrating a preferred embodiment of the invention, wherein.

In the manufacture of gears highly accurate methods are available for finishing the profiles of gear teeth prior to hardening. However, after the gears have been heat treated to harden the working surfaces of the teeth, the only methods heretofore available for finishing the hardened surfaces of the teeth have been grinding and lapping.

Grinding is a slow and tedious process. It also has the objection that in many cases it tends to burn the surfaces of the teeth and to produce stress areas where fatigue failure develops.

Lapping is subject to the objections that it is a slow and messy operation, involving the use of lapping fluid. Furthermore, lapping, which has heretofore been carried out primarily with cast iron laps, results in a wearing away of the lap comparable to the removal of material from the hardened gear. Thus, lap life is short and tool cost is relatively expensive.

The present invention relates to a honing operation quite distinct both from grinding and lapping. In accordance with the present invention the tool is in the form of a gear at least the tooth portions of which are relatively hard and strong and contain abrasive particles embedded therein and exposed at the surface thereof in position to be drawn in abrading or cutting relation across the surfaces of the teeth of the work gear as the tool and work gear are rotated in mesh. In general, this has been accomplished by forming the tooth portions of the tool of an essentially hard, strong, slightly yieldable and highly resilient resin compound.

In general, the honing operation may be accomplished in two ways. In some cases the hone and gear being finished are in relatively loose mesh, preferably at crossed axes, and the hone or gear is positively driven, thereby driving the other member of the pair in mesh, and rotation of the driven member may be opposed by a suitable braking action. Experience has indicated however, that best results are normally to be anticipated when the hone and gear are rolled together in mesh at crossed axes under controlled relatively light radial pressure.

Figure 2:
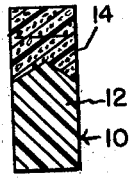
Figure 2 is a section on the line 2—2, Figure 1.

Referring now to the drawings there is illustrated a portion of a gear honing tool indicated generally at 10. The inner annular portion or core 12 may be formed of any suitable material such as metal but for convenience and economy, it is preferred to employ a resin compound which may be similar to the resin employed in the toothed portion of the hone except that it does not contain the abrasive grains or particles. The outer toothed portion indicated at 14, is formed of the resin compound and has its teeth 16 accurately shaped to be conjugate to the desired final form of the work gear to be finished. As indicated in Figure 2, this outer tooth portion 14 of the hone contains a multiplicity of abrasive particles which are indicated therein.

Inasmuch as the operating portion of the hone, namely, the toothed portion 14 thereof, has a relatively large quantity of the extremely hard abrasive grains or particles therein, it would be possible to finish the teeth of the hone to desired shape only by an expensive grinding or trimming process. If this were done the cost of the hones would be prohibitive. In accordance with the present invention the hones are cast to final form and are ready for use immediately upon removal from the mold. Inasmuch as the hone, to be commercially acceptable, must be produced by a final casting process, it is essential to form the hone from a material having a very minimum shrinkage or in other words, to have a very high degree of dimensional stability. So far as applicants are aware, the only resin suitable for commercial production of hones at the present time is epoxy resin. Inasmuch as new resins are constantly being developed, and since the utility of the particular resin in the particular case is independent of its chemical make-up, it is of course entirely possible that in the future new resins differing chemically from epoxy resin but having the required physical properties now found only in epoxy resin, may become available.

Epoxy resin is particularly suitable because of the ease with which it may be cast. The epoxy resin is a thermal setting resin which when mixed with a hardener or catalyst may be cured at moderate temperatures and will completely cure in a relatively short time. A particular resin which has proved the most satisfactory in extended use is identified by the supplier, Marblette Corporation, as formula 1270A, in which the resin component is epoxy resin supplied by the Bakelite Corporation. To this is added Lionite or Carborundum, 325 grit, and chopped glass fiber $\frac{1}{32}$ inch in length. The compound may in some cases contain some rubberizer which will increase flexibility without substantially decreasing hardness or tensile strength. The rubberizer added is identified by the supplier, Marblette Corporation, as No. 2 rubberizer and may be used in an amount not to exceed 25%.

The Marblette Corporation, supplier of the epoxy resin referred to above, describes the epoxy resin as follows:

An epoxy resin suitable for this invention may be produced by reacting epichlorohydrin and bisphenol A in the presence of a sodium hydroxide solution in water. The reaction is carried out at a temperature of about 100 degrees centigrade. After the condensation reaction has taken place, the resin is freed of residual epichlorohydrin and is washed well to remove salt and soluble by-products. The reaction is carried out to produce a reaction product having an average molecular weight of approximately 400. The resin is a liquid. The epoxy value, equiv./100 gm. is 0.50. The hydroxyl groups per molecule are 0.14–0.28.

A suitable curing agent is an aliphatic polyamine such for example as diethylene triamine. This compound when mixed as described herein may be satisfactorily cured in four hours between 125 and 150 degrees Fahrenheit.

The fine abrasive particles incorporated in the resin compound by the supplier are for the purpose of rendering the resin wear resistant and are not for the purpose of producing an essentially abrasive article. The latter function is supplied by the addition of relatively large grit abrasive with particle sizes ranging from 46 grit to 100 grit silicon carbide. These particles are mixed uniformly in the resin compound and are cast into the annular tooth form in a suitable accurately formed mold. Satisfactory results have been obtained when the abrasive particles are mixed uniformly through the resin compound just prior to casting.

There has been found to be a definite relationship between strength and shock resistance of the material of the hones with the size of grit employed. Excellent results have been obtained employing 60 grit silicon carbide. However, on very fine pitch teeth improved strength characteristics are observed if a finer grain abrasive, as for example 100 grit, is employed.

A second factor controlling the selection of the grit size is of course the type of surface finish desired. In one hone which was designed particularly to produce a three to five micro inch surface finish on gear teeth, the abrasive particles in the hone were 280 grit. It would appear that so far as surface finish is concerned it would never be necessary to use smaller than 280 grit. However, for extremely fine pitch gears as for example 92 pitch, the dimensions of the teeth on the hone are so small that it may be desirable to use abrasive grains having a grit size as small as 500 grit.

Conversely, on very coarse pitch gears, and particularly where surface finish is not critical, grit size as large as 46 or even larger is practical.

Production of the gear hone by the following described method has proven satisfactory: In the first place, a metal gear is accurately finished to the exact dimensions and specifications required in the hone. The tooth surfaces of this metal gear are treated with a suitable parting compound such for example as wax. This gear is placed in a suitable container and resin compound in liquid phase is poured into the container to surround the gear. The resin compound is preferably the epoxy resin compound with the relatively large abrasive particles omitted therefrom. This material is characterized by high dimensional stability. The resin compound is then caused to set by the application of heat. When the material has set, the metal gear is removed, the parting agent permitting ready separation.

Figure 1:
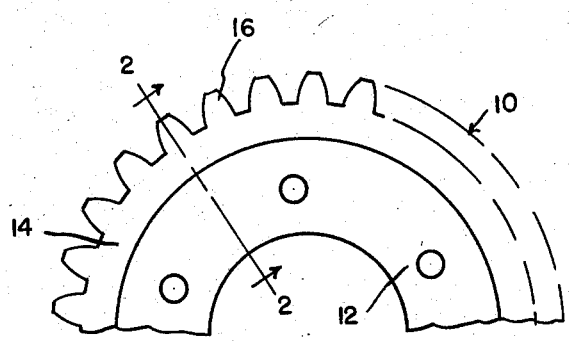
Figure 1 is a fragmentary elevational view of a gear hone constructed in accordance with the present invention.

The hollow mold thus produced reproduces the characteristics of the master metal gear with extremely high fidelity. To produce the hone, a core such as that illustrated at 12 in Figure 1, is accurately centered within the mold leaving an annular space for the reception of the resin compound containing the relatively large abrasive particles. This material in fluid phase and including the catalyst or hardener, is poured into the space between the core and the mold, the inner surfaces of the mold having been treated with a suitable parting compound.

Again, the resin compound is caused to set by heating, excellent results having been obtained when heated at a temperature of approximately 180 degrees Fahrenheit. Best results have been obtained when the cure is continued for a hour and a half, the hone permitted to cool and then given a second cure of approximately an hour. This is found to produce better results than a single cure of two and one-half hours' duration.

The Marblette epoxy casting resin which is supplied by the Marblette Corporation, has before the addition of the relatively coarser abrasive particles, a compressive strength in excess of 20,000 pounds per square inch, a density of 100 pounds per cubic foot, an impact resistance of 1.5 ft.-lbs./in. notch, a shrinkage of .0007 inch per inch, and a thermal expansion of $6.5$ times $10^{-5}$ inches per inch. The hardness of the completed hone with the relative coarse abrasive particles included has been varied from 90 on the Rockwell M scale to a reading of 40 points below zero on this scale, and within this substantial range of hardness commercially satisfactory results have been attained.

The essential physical properties which appear to explain the operating efficiency of hones constructed in accordance with the present invention is the support of the individual abrasive particles in a very hard material which is nevertheless slightly yieldably and highly resilient. Thus, the abrasive particles are firmly held in the surface of the hone and are dragged thereby across the surface of the teeth of the hardened gear being honed. As a result, the hone is found to be extremely free-cutting and exhibits a useful life many times greater than that attainable with cast iron laps.

A feature of the invention which of course is an essential requisite for the production of accurate gears is the ability of the teeth of the hone to hold the exactly predetermined form cast therein. At the same time, the material cannot be a brittle material such for example as commonly employed in grinding wheels, since it is inherent in the operation in mesh with the work gear that local distortion of surface portions of the teeth of the hone takes place. This is permitted because of the slight yieldability of the material. This may be characterized essentially as a lack of brittleness which prevents crumbling of the material of the hone under load. Accompanied with the property of slight yieldability is the property of high resilience so that instantaneously upon release of the load which has caused small surface portions of the teeth of the hone to yield, the material will move back to its initial position. This yieldability accompanied by instantaneous resilient retraction permits a heavily stressed abrasive particle to yield slightly when encountering a relatively high point in the surface of the work gear. As the abrasive particle is thus dragged across the high point, a relatively greater pressure is exerted between the abrasive particle and the surface of the work gear, with consequent increase in removal of material. Thus, not only does the relatively hard, slightly yieldable and highly resilient resin compound prevent crumbling of the hone and breaking out of abrasive particles under load, but it also automatically concentrates the abrading or finishing action on the high zones or areas of the teeth of the gear which require the most removal of metal.

The highly successful operation of this hone in commercial production is thus probably attributable to two factors. The first of these is that the proportion of resin to the abrasive particles is sufficient to provide a solid or substantially solid matrix in which the individual particles are separately embedded. This is to be contrasted with a structure which would result from providing only sufficient bonding agent to unite the abrasive grains in a porous or spongy construction. The second of these of course is the physical properties of the particular resin and these properties are divided into two groups. The first group of properties are those which render the material suitable for the production of sufficiently accurate gear honing tools by casting, and further, from the commercial standpoint, by casting in an operation which does not require expensive equipment and prohibitively costly molds. Obviously, the satisfactory casting of a relatively large number of hones requires a method by which the hone molds can be made at a reasonable cost. Also, it is of course essential to provide a casting resin having as high as possible a dimensional stability. The epoxy resin disclosed herein is well adapted to the production of hones as disclosed herein. The second group of physical characteristics of course refers to the characteristics entering into the operation of the tool in honing. These characteristics are the requisite strength combined with a sufficient hardness to maintain the highly accurate tooth form while at the same time having a lack of brittleness which would render tool life unacceptably short. This lack of brittleness may be expressed as a certain limited yieldability accompanied by elastic return to the position occupied before yielding. Thus, a particular abrasive particle when too heavily stressed will yield very slightly and thus prevent it from being torn out of its embedded matrix. This yielding of course is accompanied by an increase in pressure existing between the abrasive grain and the work with a corresponding increase in removal of metal. As soon as the particle is freed from its stressed condition it returns substantially instantly to its initial position where it again is available for producing an accurate machined surface.

This limited yieldability of the material which permits the embedded abrasive particles to yield when over stressed and to return to their initial position accounts for the unexpectedly long tool life which permits a single hone to finish under ideal conditions 10,000 or more work pieces.

While reference is made to yieldability, it should be understood that this does not imply in any sense that the tool is soft or rubbery. The actual hardness of the material as measured on the Rockwell M scale indicates a relatively hard material. The cast surface of a hone produced in accordance with the present invention appears quite hard and when tapped by a hard object sounds and acts as though it were perfectly hard. Thus, the tool apparently has the characteristic in operation of acting under normal conditions as though it was perfectly hard with no appreciable yieldability so that removal of metal from a hardened gear is perfectly practical without appreciable distortion of the material of the teeth of the hone. It is only when exceptional severe localized stresses occur that the yieldability of the material comes into play to prevent fracture or tearing out of an overstressed abrasive particle.

It is because these properties are present in hones constructed in accordance with the present invention that the hones have proven themselves to be extremely successful in commercial production whereas many prior attempts to produce commercially feasible gear honing tools have met with uniform failure.

While the present hone is useful in a general finishing operation to improve all tooth characteristics, it has a particular utility in the removal of nicks and minor imperfections in hardened work gears. It will be readily apparent that in its operation of removing nicks and the accompanying outstanding small projections, the working surfaces of the teeth of the hone are subjected to exceptionally severe local stresses. If the material of the hone were not definitely yieldable under the extremely high unit pressures thus applied, it will be appreciated that passage of a nick on a tooth across the surface of a tooth of the hone would score the hone tooth or otherwise injure it. Such however, is not the case and hones constructed in accordance with the present invention have successfully operated to remove nicks and local imperfections from any thousands of gears per hone.

The hone constructed in accordance with the present invention is operated in mesh, preferably at crossed axes, with the work gear, which may be hardened previously to the honing operation. While the hone and gear may be driven in mesh at substantial speeds, such for example as a pitch line velocity of 1000 or more feet per minute, it will be appreciated that the relative sliding movement between the surfaces of the teeth of the hone and gear is much slower and variable from a minimum at an operating pitch line to a maximum adjacent the top and bottom portions of the teeth. At the pitch line, with the gear and hone at crossed axes, the relative sliding action which results in honing of the teeth of the gear is due only to the crossed axes relationship and is a function of the angle in space between the axes of the gear and hone.

The honing tool produced in accordance with the present invention is a substantially solid or dense structure. The proportionate quantity of resin abrasive grains is such as to produce a solid structure as contrasted with a porous or spongy structure characteristic of certain grinding wheels, in which only sufficient bonding material is present to interconnect adjacent grains of abrasive. Particularly, when a finer grit size abrasive is used, the material of the present hones has all the appearance of a perfectly homogeneous solid material, appearing almost like metal on its smooth cast surfaces. Even when the material is fractured, the exposed surface presents the impression of a perfectly uniform homogeneous solid dense material.

Perhaps the feature which distinguishes the present material over material from which attempts have been made in the past to produce honing or abrading tools is in the relatively high proportion of resin so that each of the abrasive grains is in effect surrounded and embedded in resin, rather than being bonded at a limited contact area with adjacent grains. While the proportion of grains is normally quite large, nevertheless the proportion of resin in the material is sufficiently great to prevent the occurrence of any appreciable number of voids in the solid material.

Emphasis has been placed upon the fact that the hone disclosed herein is cast in final form. Only by casting the toothed portion of the hone to its final operating form is it commercially practical to produce honing tools. This in turn is possible only when employing a resin compound having the required high degree of dimensional stability which permits accurate reproduction first of a master gear to produce the mold, and second, of a hone to reproduce the form of the mold. The only resin which applicants have been able to discover having the requisite dimensional stability is epoxy resin. Fortunately, this resin has physical properties when combined as disclosed herein, which are suitable for a hone and which permit long life in honing and finishing hardened gears. The physical properties, besides the normally expected strength characteristics, are the combination of substantial hardness accompanied by slight but definite yieldability and by a high resilience so that when portions of the material are caused to yield by excessive localized loads, they are restored upon release of the load to their accurately cast form.

The factors of hardness, yieldability and resilience determine the life of the hone, and the test of hardness to determine Rockwell M hardness is a valuable indication both of hardness and yieldability which may be considered in general as dependent upon the same physical property. The actual measurement is of deflection under localized pressure.

A specific example of a material which has proved highly satisfactory in extended commercial usage is given below where the parts are referred to by weight:

*Resin compound*

| Material: | Parts by weight |
|---|---|
| Epoxy resin | 100 |
| Abrasive filler—325 grit—silicon carbide | 25–100 |
| Glass fibers—1/32 inch | 10– 30 |

This material is purchased from the Marblette Corporation under the identifying number of 1270A.

Just prior to pouring the compound to produce the hones, the resin compound is mixed with abrasive such for example as silicon carbide particles having a grit size of from 46 to 280. Excellent results are attained when 100 parts of the resin compound as described above, are thoroughly mixed with 100–150 parts of the silicon carbide abrasive. Within this range, the resin and grains form a dense, solid material characterized by substantially no voids therein, the grains being essentially separated and embedded in and surrounded by the resin matrix. At this time a catalyst or hardener is added to the mixture, preferably between 15 and 20 parts per 100 parts of the resin compound. This hardener is a conventional hardener for use in conjunction with epoxy resin, as for example an aliphatic-amine or poly-amine.

The hones constructed in accordance with the present invention may be in the form of cylindrical gears; that is, either spur or helical, and they may be either internal or external. Thus for example, a hone in the form of an external gear may be used to finish the teeth of an external or an internal work gear. Conversely, a hone in the form of an internal gear may be used to finish the teeth of an external work gear. The invention is not of course limited to cylindrical gears, but has particular advantage in the finishing of generally tapered gears such for example as bevel or hypoid gears.

While reference has been made in the foregoing to the fact that the material of the hone is essentially a solid resin compound having the abrasive particles embedded therein, it is recognized that in mixing the abrasive particles with the resin compound while the resin compound is in liquid phase, it is impossible to avoid the introduction of some bubbles into the mixture. The mixing operation is carried out with extreme care, preferably under a substantial vacuum, to minimize and so far as possible eliminate the presence of bubbles in the finished material. Accordingly, where the resin compound is defined as solid, it will be understood that it encompasses a material which is essentially solid even though some air bubbles may be included.

The use of epoxy resin in the resin compound has the additional advantage that epoxy resin exhibits extremely high adhesive properties with respect to the abrasive grains. Thus, a grain which is partly exposed and partly surrounded by the resin compound, is supported not only by the mechanical action of the resin in surrounding it, but also by adhesion existing between the interfaces of the resin compound and abrasive grain.

The drawing and the foregoing specification constitute a description of the improved gear honing tool in such full, clear, concise and exact terms as to enable any person skilled in the art to practice the invention, the scope of which is indicated by the appended claims.

What we claim as our invention is:

1. A gear hone comprising a gear-like body having teeth conjugate to the required tooth form of a gear to be finished, the surface portions of said teeth at least to a substantial depth comprising a solid cured epoxy resin compound having separated abrasive particles of a grit size of 46–280 embedded therein and exposed at the surface thereof, said cured resin compound having a hardness as measured on the Rockwell M scale between 90 above and 40 points below zero, but being slightly yieldable under excessive local pressure to prevent crumbling, and highly resilient to return immediately to exact initial form when relieved of the excessive local pressure.

2. A gear hone comprising a gear-like body having teeth conjugate to the required tooth form of a gear to be finished, the surface portions of said teeth at least to a substantial depth comprising a solid cured epoxy resin compound having separated abrasive particles of a grit size of 46–280 embedded therein and exposed at the surface thereof, said cured resin compound having a hardness as measured on the Rockwell M scale between 90 points above and 40 points below zero, but being slightly yieldable under excessive local pressure to prevent crumbling, and highly resilient to return immediately to exact initial form when relieved of the excessive local pressure, said compound having a mold shrinkage not greater than .001 inch per inch.

3. A gear finishing hone of cast gear-like form having teeth at least the surface portions of which are an epoxy resin compound comprising approximately 100 parts by weight of epoxy resin, 25–100 parts fine grit abrasive filler, to which compound is mixed 100–150 parts of abrasive particles of 46–280 grit size and 15–25 parts hardener per 100 parts of compound.

4. A gear finishing hone as defined in claim 3 in which the epoxy resin compound includes 10–30 parts by weight of short glass fibers per 100 parts by weight of the epoxy resin.

5. A gear hone comprising a gear-like body having an annular toothed portion provided with teeth conjugate to the required tooth form of a gear to be finished, at least the annular toothed portion of said hone being cast to final form and being formed of a solid epoxy resin compound having abrasive particles of grit size 46–280 embedded therein and exposed at the surface thereof, said annular toothed portion having a hardness of between 90 above and 40 below zero on the Rockwell M scale.

6. A hone as defined in claim 5 in which the annular toothed portion of the hone comprises 100–150 parts by weight of the abrasive particles per 100 parts of the resin compound.

7. A hone as defined in claim 6 in which the epoxy resin compound comprises 25–100 parts by weight of a fine grit abrasive filler per 100 parts of epoxy resin.

8. A gear hone comprising a gear-like body having an annular core, an annular toothed portion connected to said core and provided with teeth conjugate to the required tooth form of a gear to be finished, at least the annular toothed portion of said hone being cast to final form and being formed of a solid epoxy resin compound having abrasive particles of grit size 46–280 embedded therein and exposed at the surface thereof, said annular toothed portion having a hardness of between 90 above and 40 below zero on the Rockwell M scale.

References Cited in the file of this patent

UNITED STATES PATENTS

| | | |
|---|---|---|
| 1,912,216 | Page | May 30, 1933 |
| 2,027,090 | Carter | Jan. 7, 1936 |
| 2,051,558 | Voegeli-Jaggi | Aug. 18, 1936 |
| 2,073,590 | Sanford | Mar. 9, 1937 |
| 2,097,803 | Sanford | Nov. 2, 1937 |
| 2,105,896 | Stubbs | Jan. 18, 1938 |
| 2,113,185 | Thilenius et al. | Apr. 5, 1938 |
| 2,165,386 | Klomp | July 11, 1939 |
| 2,189,733 | Kistler | Feb. 6, 1940 |
| 2,218,795 | Kistler | Oct. 22, 1940 |
| 2,351,842 | Seibold | June 20, 1944 |
| 2,521,911 | Owen | Sept. 12, 1950 |
| 2,779,668 | Daniels et al. | Jan. 27, 1957 |